Nov. 7, 1967 B. E. SEAR 3,351,953

INTERCONNECTION MEANS AND METHOD OF FABRICATION THEREOF

Filed March 10, 1966 2 Sheets-Sheet 1

INVENTOR.
BRIAN E. SEAR
BY Arthur Frelich

ATTORNEY

INVENTOR
BRIAN E. SEAR
BY Arthur Freilich
ATTORNEY 3,351,953

INTERCONNECTION MEANS AND METHOD OF FABRICATION THEREOF

Brian E. Sear, Canoga Park, Calif., assignor to The Bunker Ramo Corporation, Stamford, Conn., a corporation of Delaware Filed Mar. 10, 1966, Ser. No. 533,375
4 Claims. (Cl. 174—68.5)

ABSTRACT OF THE DISCLOSURE

A structure for supporting and interconnecting electrical circuit components. The structure is comprised of a stack of electrically conductive plates. Interconnections, effectively constituting coaxial transmission lines, are formed using the conductive plates as ground planes. Aligned troughs are formed in opposed surfaces of the plates. The troughs are filled with dielectric material and an electrically conductive path is supported between the dielectric material disposed in opposed troughs. The plates are adhered together by a substantially homogenous dielectric adhesive sheet disposed therebetween.

This invention relates generally to electrical interconnection means and a method of fabrication thereof, which means are particularly useful for interconnecting microminiaturized high speed circuits.

As the switching and clock rates of various systems, such as digital data processing systems, are increased, the characteristics of the circuit interconnection means employed in such systems become significant; that is, whereas the characteristics of the interconnection means are of little importance when used with relatively low frequency signals, they can have a pronounced effect on system performance when the transient durations (rise and fall times) of the signals become a significant fraction of the time required to propagate the signals between circuits or components thereof. Additionally, system performance is greatly affected when signal propagation time between circuits is not negligible in comparison with the system clock period. Where the transient or clock durations become greater than five to ten percent of the signal propagation time between circuits via the interconnecting means, the interconnecting means must be regarded as a distributed circuit element and therefore must be considered as an integral part of the circuitry itself if accurate and predictable results are to be achieved. Concisely stated, where the signal propagation time is significant, the interconnection means must be viewed as a transmission line, and transmission line theory must be applied to achieve proper circuit and system designs.

Recognizing that the interconnection means must be considered as a transmission line, it follows that the line must be uniform and properly terminated with respect to impedance if signal reflections and resulting distortions are to be prevented; that is, if the physical and electrical properties of the interconnection means are not uniform, then the non-uniformities (gradual or abrupt) appear as changes in the characteristic impedance resulting in signal reflections. Such reflections can have a detrimental effect on circuit performance by, for example, resulting in triggering delays. When interconnection propagation time becomes comparable to the clock period, reflections become especially troublesome because the reflected signal, if not sufficiently attenuated, can spill over into the logic allocation for the next clock period, thus causing circuit malfunctions.

In addition to signal distortion problems resulting from signal reflections, crosstalk problems resulting from coupling between adjacent circuits becomes significant in high speed circuitry because of the rates of change in the electric and magnetic fields during transients. These problems, of course, can become of special importance when high interconnection densities are desired for compatability with microminiaturized circuits.

In view of the foregoing considerations, various attempts have been made in the prior art to develop techniques for interconnecting high speed circuits, and more particularly high speed microminiaturized circuits. Some of these techniques are discussed in U.S. patent application Ser. No. 430,321, filed on Feb. 4, 1965, and assigned to the same assignee as the present application. The cited patent application discloses an improved means suitable for interconnecting high speed circuits together with a method of fabricating such an interconnection means.

More particularly, the cited patent application discloses an interconnection technique which involves providing planar coaxial interconnections between components and circuits. The interconnection means are formed, according to a preferred embodiment of the disclosed invention, by etching troughs in opposed faces of conductive ground plates formed of aluminum, for example. Epoxy is deposited in each of the troughs, and a conductor is then formed on the surface of the epoxy in one of the troughs. A conductive bonding material, such as a metal loaded epoxy, is then deposited on the opposed surfaces of the aluminum plates. A non-conductive epoxy is then deposited on the epoxy in the trough opposite to the conductor. The two plates are then laminated together by the application of heat and pressure.

An interconnection structure constructed in accordance with the teachings of the cited patent application possesses characteristics which make it extremely attractive for the contemplated applications. The structure provides uniform self-shielded transmission lines which can easily be employed to connect logic circuits. In addition, a continuous range of characteristic impedances can be obtained as a function of the geometry of the troughs and the width of the conductors. This provides a great advantage over an interconnection approach using miniature coaxial cable where only a few discrete values of impedance are available. High interconnection densities with negligible crosstalk can be achieved making this approach compatible with packaging densities afforded by integrated circuits. The high packaging densities, in turn, will enable minimization of propagation time within the system. The aluminium plates also assure that the interconnection structure has excellent heat dissipation characteristics.

The present invention is based upon the recognition that by modifying the method and apparatus of the cited patent application in certain respects, farbication costs can be considerably reduced without significantly degrading its characteristics. More particularly, in accordance with the present invention, in lieu of employing a conductive bonding material to interconnect adjacent ground planes and a non-conducting bonding material between opposed epoxy-filled troughs, a thin non-conductive bonding material, such as a sheet of B stage epoxy, is employed to laminate the pair of conductive plates together with plated-through holes being provided to electrically interconnect the plates.

It has been found that planar coaxial circuitry can be provided in accordance with the present invention at a significantly lower cost than in accordance with the teachings of the cited patent application with only a slight degradation of qualities.

The novel features that are considered characteristic of this invention are set forth with particularity in the appended claims. The invention itself will best be understood from the following description when read in connection with the accompanying drawings, in which:

Figure 1:
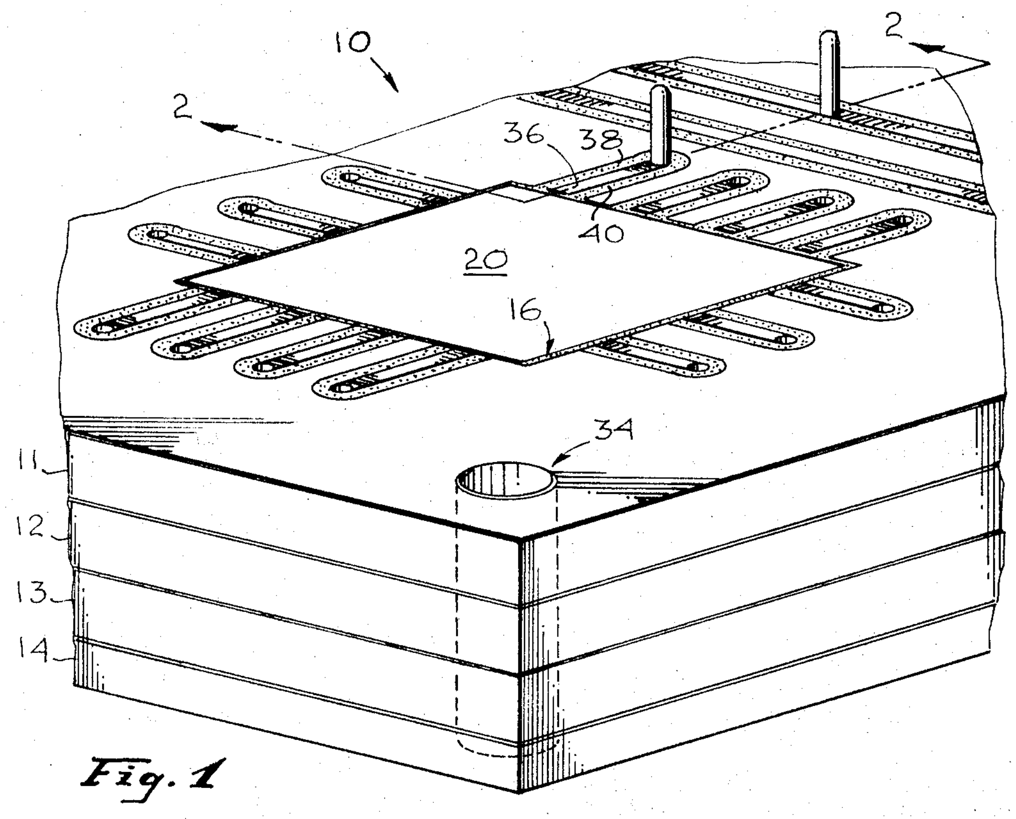
FIGURE 1 is a perspective view illustrating a portion of a multilayered coaxial circuit assembly constructed in accordance with the present invention.
Figure 2:
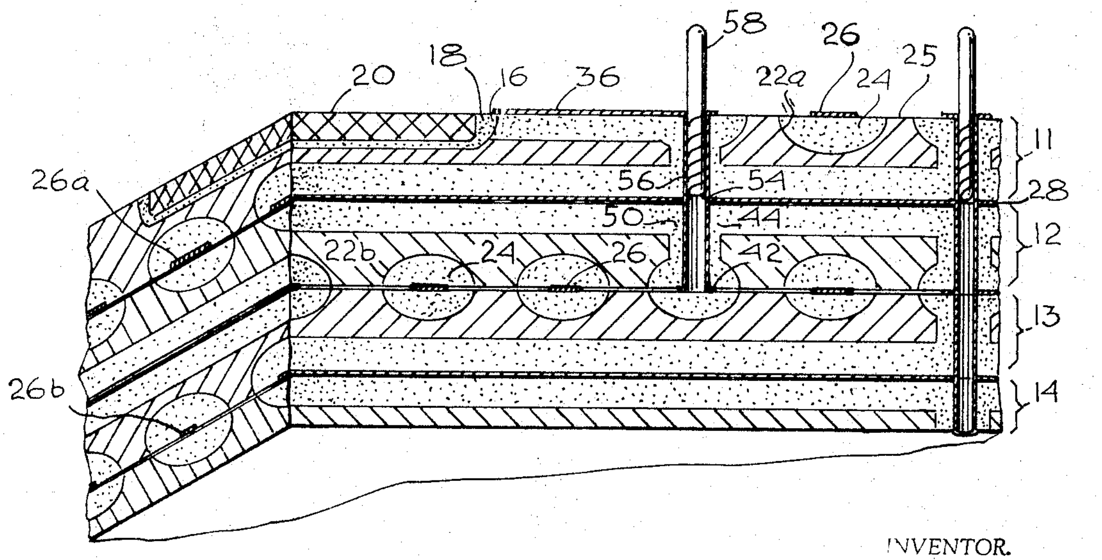
FIG. 2 is a sectional view taken substantially along the plane 2—2 of FIG. 1.

Attention is now called to FIGS. 1 and 2 of the drawings, which illustrate a portion of a completed electronic assembly 10 constructed in accordance with the present invention. The assembly is comprised of a plurality of stacked boards or plates 11, 12, 13, and 14, which are formed of a conductive material, such as aluminum, copper, magnesium, low alloy steel, or other metal. The plates 11, 12, and 13, both of whose surfaces are to be used to carry circuitry, nominally have a thickness between 0.015 and 0.1 inch. Their thickness can, however, be suitably larger if necessary to carry components or circuits mounted therein. On the other hand, the thickness of plate 14, which is used as a cover plate and thus only has circuitry on one side thereof, need not be so large.

As an example, the upper plate 11 in the assembly 10 is provided with a recess 16 therein. The recess is partially filled with a dielectric material such as epoxy 18, and supported on the epoxy is, for example, a discrete monolithic or other microelectronic function block 20. A plurality of such function blocks 20 can be distributed througout the assembly 10. In accordance with the present invention, inexpensive means are provided for interconnecting such function blocks 20 to each other and to components external to the assembly 10. As noted in the introduction to the present specification, such interconnecting means must be treated as transmission lines if the function blocks 20 are to be operated at extremely high speeds.

In accordance with the present invention, troughs 22 are defined in either the top or bottom or both surfaces of each of the plates. The troughs in each surface preferably extend parallel to one another to avoid interference. Troughs on opposite plate surfaces, however, preferably extend perpendicular to one another so as to form a matrix. It should be understood, however, that the invention is not restricted to any particular pattern of troughs, and indeed any arbitrary pattern can be employed. In the preferred embodiment of the invention, all of the troughs 22 are filled with a dielectric material, such as epoxy 24, to a level substantially coplanar with the surface in which the trough is formed. Thus, the epoxy 24 in trough **22*a* is substantially coplanar with surface 25 of plate 11 in which trough 22*a* is formed. The plates are oriented so that each trough thereof is mated with a similar trough in the adjacent surface of an adjacent plate. Thus the troughs in the bottom surface of plate 12 are aligned with and opposed by the troughs in the top surface of plate 13. Flat conductors 26 are formed on the flat surface of the dielectric material 24 in the troughs. Each conductor 26** is thus disposed substantially in the center of opposed troughs and is accordingly susbtantially surrounded by conductive material.

Adjacent surfaces on adjacent plates are bonded together by providing a suitable dielectric adhesive 28 therebetween. For example, a sheet of only partially cured (B stage) epoxy can be disposed between the bottom surface of plate 11 and the top surface of plate 12. In order to set the epoxy to thus bond the plates together, appropriate heat and pressure can be applied.

It should be apparent from what has been said thus far that the conductors 26 will be almost completely surrounded and shielded by the conductive material of the plates. The dielectric adhesive 28 will slightly space adjacent surfaces from one another, but it has been found that this spacing does not substantially degrade the shielding around the conductors 26. In order to assure electrical interconnection between all of the plates to permit them to function as a common ground plane, a hole 34 is provided extending through all of the plates and through the adhesive therebetween. The inner wall of the hole 34 is plated with a conductive material to thus electrically interconnect the plates.

From what has been said thus far, it should be appreciated that each conductor 26, together with the surrounding ground plane, is directly electrically equivalent to a conventional coaxial line susceptible to analysis by conventional transmission line theory. It should thus be recognized that the electrical characteristics of the interconnections in the assembly 10 are in part determined by the dimensions and geometry of the central conductor 26 and the troughs 22. In accordance with the present invention, these parameters can be accurately controlled; that is, since the conductor 26, as will be described in greater detail hereinafter, is preferably formed on the dielectric material 24 by plating and selective etching, its dimensions can be very accurately controlled. Likewise, the geometry of the troughs 22 can be accurately controlled inasmuch as these can also be formed by etching. In order to demonstrate that the dimensions of the conductors 26 and geometry of the troughs 22 can be formed to selected dimensions and geometry, conductor **26*a* is illustrated as having a greater width than conductor 26*b*. Similarly, the trough 22*b* is illustrated as having a different geometry than the trough 22*a***.

As noted, the conductors 26 interconnect the function block 20 to either other function blocks in the assembly 10 or to external circuits and components. For example, conductors 36 on epoxy 38 in troughs 40 are connected to the function block 20. In order to provide circuit connections between plates, as, for example, from the conductor 36 on the top surface of plate 11 to the conductor 42 between plates 12 and 13, aligned holes 44 are provided in both plates 11 and 12. The aligned holes 44 are filled with a dielectric material 50 which can be considered as being integral with the dielectric material or epoxy filling the trough 22. A second hole 54 is formed in the dielectric material 50 extending completely through the plates 11 and 12. The wall of the hole 54 is plated with a conductive material 56 to interconnect the conductors 36 and 42. A conductive rod 58 can be fitted in the hole 54 in contact with the conductive material 56 for interconnection with external devices.

Figure 3:
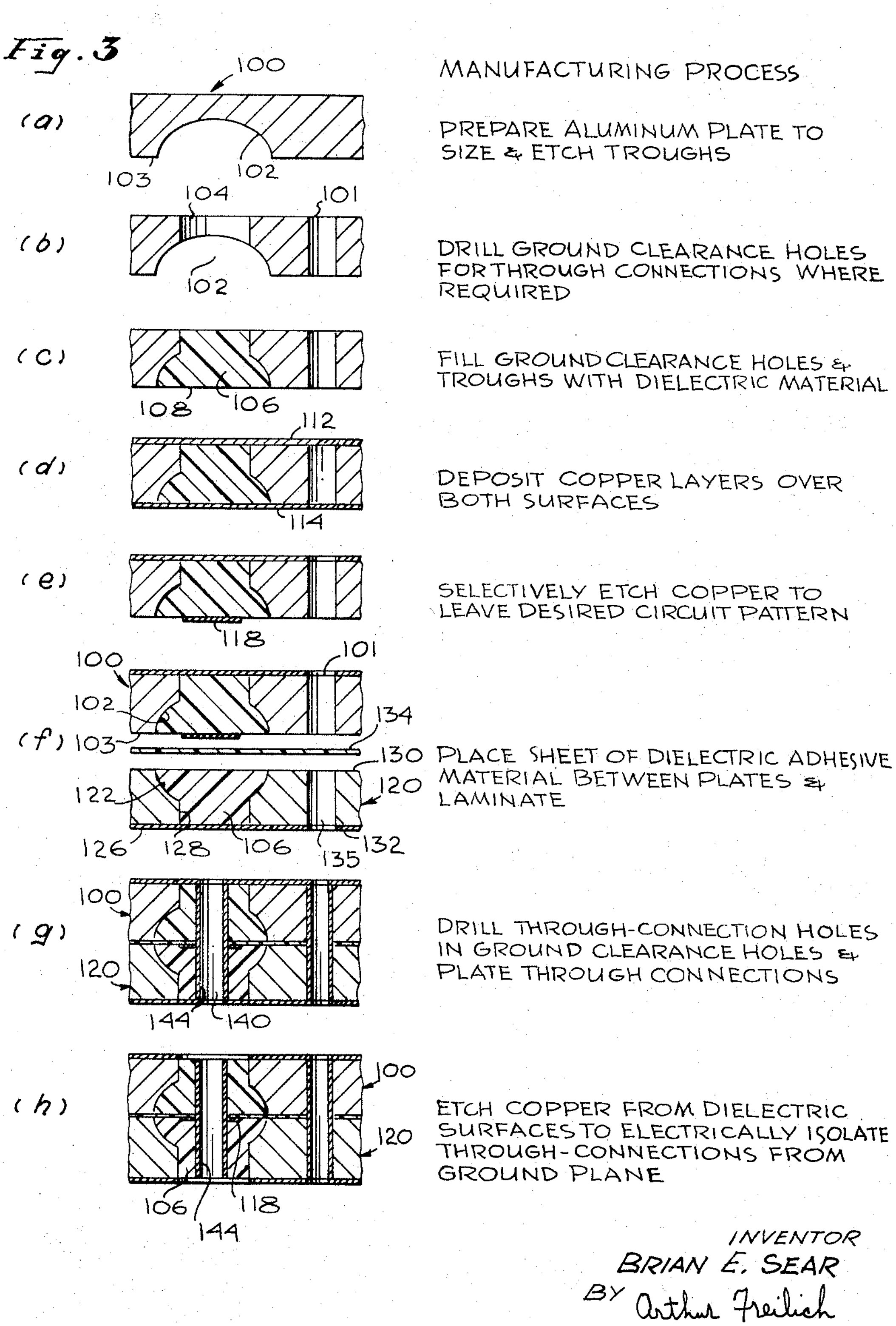
FIG. 3 is comprised of diagrammatic illustrations depicting the steps involved in manufacturing coaxial circuit structures in accordance with the present invention.

Thus far, only the construction of the assembly 10 of FIGS. 1 and 2 has been considered, and the steps involved in a method of fabricating such an assembly have not been mentioned. In order to describe an optimum method of fabrication, attention is now called to FIG. 3, which illustrates in views *a* to *h* a sequence of steps employed to fabricate the assembly 10 of FIGS. 1 and 2.

Typically, an aluminum plate 100 (FIG. 3*a*) is employed having a thickness on the order of .015 to .10 inch or more depending upon whether it is to be provided with cavities for receiving function blocks as aforedescribed. The plate 100 is initially prepared by shearing it to the desired size from aluminum sheet material. Registration holes 101 are then drilled in the plate. An additional plate of the same dimensions as plate 100 to be used for covering the circuitry on the plate 100 is also prepared from the aluminum sheet material and has registration holes drilled therein.

The surfaces of the plate 100 are then prepared for the application of a photoresist mask by conventional techniques which may consist of dry sanding and the application of cold solvent degreasing material and other surface treating solutions.

A metal etch photoresist is then applied to the bottom surface 103 of the plate 100. The resist is then exposed and developed in all areas except where the troughs 102 are to be formed. The plate 100 is then chemically etched to form the troughs 102. The metal etch resist is then removed.

Ground clearance holes 104 are then drilled through the plate 100 into the troughs 102 where electrical through-connections are desired. The holes 104 and troughs 102 are then filled with a dielectric material 106 which is bonded to the plate 100. The dielectric material 106 is then lightly sanded to remove any excess material and make its surface 108 substantially coplanar with the bottom surface of the plate 100.

Subsequently (FIG. 3*d*), copper layers 112 and 114 are respectively electroplated on the top and bottom surfaces of the plate 100 while the registration holes 101 are masked. A photoresist is then applied to the copper layer 114 on the bottom plate surface. The conductors 118 are then exposed and developed. The copper layer 114 is then etched to leave the desired circuit pattern comprised of conductors 118 on the bottom plate surface.

The cover plate 120 (FIG. 3*f*) is also subjected to the fabrication steps illustrated in FIGS. 3*a* to 3*c* to thus form troughs 122 constituting mirror images of the troughs 102. The troughs 122 communicate with a bottom surface 126 through ground clearance holes 128. The troughs 122 and ground clearance holes 128 in plate 120 are filled with the dielectric material 106, which is also sanded so as to be essentially coplanar with the top surface 130 of plate 120. A copper layer 132 is then plated on the surface 126 of the plate 120.

A dielectric adhesive 134, such as a sheet of B stage epoxy, is then inserted between the bottom surface 103 of plate 100 and the top surface 130 of cover plate 120. The registration holes 101 and 135 are registered. Suitable heat is then applied to the adhesive 134, while pressure is applied to the plates 100 and 120 to thus laminate them together.

Subsequently, a hole 140 is drilled through the plates 100 and 120 in alignment with the centers of the ground clearance holes 104 and 128. The wall of the hole 140 is then plated with copper 144.

An additional hole (not shown) can be drilled through the plates 100 and 120 and the adhesive 134 therebetween. The wall of this hole could then be plated to thus electrically interconnect the plates and enable them to function as a common ground plate. Alternatively, the walls of the registration holes 101 and 135 can be plated through to interconnect the plates 100 and 120.

The copper on the dielectric material 106 in the ground clearance holes is then selectively etched away to electrically isolate the conductor 118 and copper 144 in the hole 140 from the aluminum plates 100 and 120.

In the preferred embodiment of the invention thus far disclosed, the troughs of two opposed plates are filled with dielectric material and a conductor is formed on the dielectric material in one of the troughs. In an alternative embodiment of the invention, fabrication costs can be further reduced by deleting the dielectric material from one of the troughs. Thus, the flat central conductor will be supported on the epoxy and be spaced from the ground plane partially by the epoxy dielectric and partially by the air dielectric.

From the foregoing, it should be appreciated that a means has been provided herein for interconnecting high speed microminiaturized circuits, which means possesses the essential characteristics of and can be treated as a transmission line. Moreover, an improved method of fabrication has been disclosed which is less expensive than previous techniques, as for example disclosed in the aforecited patent application, inasmuch as it provides for bonding two conductive plates together to form a ground plane merely by employing a dielectric adhesive therebetween and providing plated-through holes for electrically interconnecting the plates.

The embodiments of the invention in which an exclusive property or privilege is claimed are defined as follows:

1. An electrical circuit structure including:
first and second electrically interconnected conductive plates supported in superposed relationship with first surfaces of said plates adjacent one another;
aligned and opposed troughs formed in said first surfaces of said first and second plates;
dielectric material disposed in each of said troughs;
an electrical conductor supported by said dielectric material in said troughs and electrically insulated from said conductive plates, said dielectric material constituting the major support for said conductor; and
a substantially continuous homogeneous dielectric adhesive sheet disposed between said first surfaces of said first and second plates adhering said plates together.

2. The circuit structure of claim 1 wherein said dielectric adhesive sheet is comprised of cured epoxy resin.

3. The circuit structure of claim 1 including a hole extending through said first and second plates and said dielectric adhesive sheet; and
a conductive lining in said hole electrically connecting said first and second plates.

4. The circuit structure of claim 1 wherein a plurality of parallel troughs are defined in said first surfaces of said first and second plates;
a plurality of parallel troughs defined in a second surface of said first plate extending perpendicular to the troughs defined in the first surface thereof;
a third electrically conductive plate supported with a first surface thereof adjacent said second surface of said first plate;
a plurality of parallel troughs defined in said third plate first surface aligned with and opposed to said troughs defined in said first plate second surface; and
an electrically conductive path supported between opposed troughs defined in said third plate first surface and said first plate second surface.

No references cited.

DARRELL L. CLAY, *Primary Examiner.*